Patented Mar. 22, 1938

2,112,139

UNITED STATES PATENT OFFICE 2,112,139

ACYLMETHYLENE DERIVATIVES OF ARYLO-THIAZOLINES AND ARYLOSELENAZO-LINES

Leslie G. S. Brooker and Frank L. White, Rochester, N. Y., assignors, by mesne assignments, to Eastman Kodak Company, Jersey City, N. J., a corporation of New Jersey No Drawing. Application July 5, 1935,
Serial No. 29,916

19 Claims. (Cl. 260—44)

This invention relates to acylmethylene derivatives of arylothiazolines and aryloselenazolines. More particularly, this invention relates to acylmethylene derivatives of benzothiazolines, naphthothiazolines, benzoselenazolines and naphthoselenazolines. Such compounds can be represented by the following general formula:

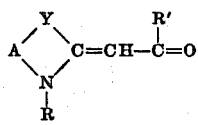

wherein A represents a phenylene group, such as the phenylene group, the methylphenylene group or the chlorphenylene group, or a naphthylene group, Y represents sulfur or selenium, R and R' represent alkyl groups, aralkyl groups or aryl groups.

A general method for the preparation of these new compounds is to treat a quaternary salt of an arylothiazole or an aryloselenazole with an acyl halide in the presence of an acid binding agent. The reaction can be represented by the following condensation of the ethiodide of 1-methylbenzothiazole and acetyl chloride in the presence of pyridine:

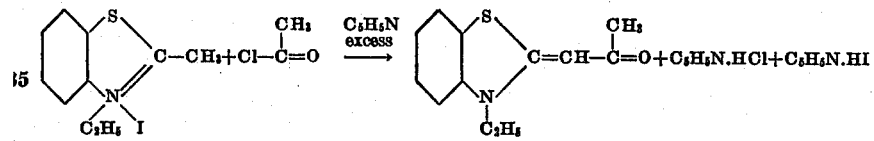

Acyl halides, such as acetyl chloride, propionyl chloride, crotonyl chloride, cinnamoyl chloride, benzoyl chloride, furoyl chloride and phenylacetyl chloride undergo condensation. Acyl bromides or iodides can also be used. Ordinarily, to effect a condensation, the quaternary salt is suspended in cold, dry pyridine, the suspension cooled to —10° to +10° C. and the acyl halide is added gradually to the chilled suspension, with agitation. When the acyl halide is all added, the reaction mixture is kept at —10° C. to +10° C. for fifteen to thirty minutes and then at room temperature for twenty to sixty minutes. By this time the reaction mixture, which had been viscous, thins out and solution is practically complete. The whole is heated at 100° C. for about fifteen minutes. The excess of pyridine is removed under reduced pressure and the residue is washed with water to remove the soluble salts of pyridine and any excess of the quaternary salt. The washed product is dried and recrystallized from ligroin, once or twice. In the case of the more insoluble compounds, recrystallization from methyl alcohol is effected. The pure compounds are usually colorless or slightly yellowish solids at ordinary temperatures.

These acylmethylene derivatives have been found to be useful in preparing symmetrical and unsymmetrical carbocyanine dyes, containing a substituent on the central carbon atom of the trimethenyl chain. See our copending application Serial No. 30,736 filed July 10, 1935.

The object, therefore, of our invention is to provide acylmethylene derivatives of arylothiazolines and of aryloselenazolines, such as are formulated above. A further object is to provide a process for the preparation of such compounds. Other more specific objects will become apparent upon a complete perusal of these specifications.

The following examples serve to illustrate our invention, but it is to be understood that our invention is not limited thereby, except as indicated in the appended claims.

*Example 1.—1-Acetylmethylene-2-methylbenzothiazoline*

291 g. (1 mol.) of the methiodide of 1-methylbenzothiazole (finely divided) was suspended in one liter of dry pyridine. The suspension was chilled to below 10° C. and 98 g. (1.25 mols) of acetyl chloride was added gradually with stirring. The reaction mixture was allowed to stand at a temperature below 10° C. for thirty minutes, at room temperature for thirty minutes and and finally was heated at 100° C. for twenty minutes. The pyridine was removed by evaporation under reduced pressure and the residue was stirred with one liter of cold water, filtered and dried. The yield was 205 g. (practically theoretical yield). The crude product was recrystallized from ligroin (boiling point 90°–120° C.), using 135 cc. per gram of material. The yield of pure product was 150 g. (73% of the theoretical). The compound was of a pale yellowish color. Melting point 160° to 162° C. The formula of this compound is:

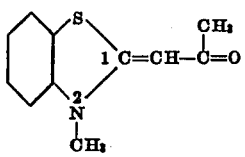

Example 2.—2-Methyl-1-propionylmethylene-benzothiazoline 29.1 g. (1 mol.) of 1-methylbenzothiazole methiodide (finely divided) was suspended in 100 cc. of dry pyridine. The suspension was chilled to 5° C. and 11.56 g. (1.25 mols) of propionyl chloride was added gradually with stirring. The reaction mixture was allowed to stand at about 5° C. for twenty minutes, at room temperature for thirty minutes and finally was heated at 100° C. for about twenty minutes. The excess of pyridine was distilled off under reduced pressure and the residue was stirred with 800 cc. of cold water and the aqueous mixture allowed to stand for three hours. At the end of this time, the solid was filtered off, washed with water and air dried. Yield was 22 g. (practically theoretical). The crude product was recrystallized from 625 cc. of ligroin (boiling point 90°–120° C.). The yield of the recrystallized product was 15.4 g. (70%). The compound was of a pale yellow color, melting at 102°–103° C. after two further recrystallizations from ligroin (boiling point 70° to 90° C.). The formula of this compound is:

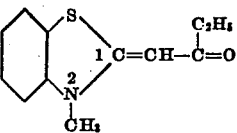

Example 3.—1-Acetylmethylene-2-ethylbenzothiazoline 305 g. (1 mol.) of 1-methylbenzothiazole ethiodide (finely divided) was suspended in one liter of dry pyridine. The suspension was chilled to below 10° C. and 98 g. (1.25 mols) of acetyl chloride was added gradually with stirring. Condensation was effected as in Example 1. The yield of crude dry product was 220 g. (practically theoretical). The crude product was recrystallized from 3500 cc. of ligroin (boiling point 90° to 120° C.). Yield was 168.5 g. (77%). A further recrystallization from three liters of ligroin (boiling point 90° to 120° C.) gave a pure product, melting at 111° to 113° C. and light yellow in color.

Example 4.—2-Ethyl-1-propionylmethylenebenzothiazoline 30.5 g. (1 mol.) of 1-methylbenzothiazole ethiodide (finely divided) was suspended in 50 cc. of dry pyridine. The suspension was chilled to below 5° C. and 11.6 g. (1.25 mols) of propionyl chloride was added gradually with stirring. The reaction mixture was allowed to stand at 0° C. for about thirty minutes, at room temperature for about fifteen minutes and finally was heated at 100° C. for fifteen minutes. Most of the pyridine was removed under reduced pressure and the residue stirred with ice water. The aqueous mixture was allowed to stand at about 0° C. for several hours. The aqueous layer was decanted from the residue and the sticky mass was stirred with three separate portions of water. The resulting solid mass was dried in the air at ordinary temperatures. The product did not lend itself to satisfactory recrystallization.

Example 5.—1-Benzoylmethylene-2-ethylbenzothiazoline 12.2 g. (1 mol.) of 1-methylbenzothiazole ethiodide (finely divided) was suspended in dry pyridine (50 cc.). The suspension was chilled to below 10° C. and 7 g. (1.25 mols) of benzoyl chloride was added gradually with stirring. The reaction mixture was allowed to stand at below 10° C. for thirty minutes, at room temperature for fifteen minutes and finally heated at 100° C. for twenty minutes. The pyridine was removed by distillation under reduced pressure. The solid residue was stirred with 200 cc. of cold water and allowed to stand over night at 0° C. The aqueous mixture was then filtered, washed with cold water and dried. The yield of crude product was 11.25 g. (practically theoretical). The crude product was recrystallized from 525 cc. of ligroin (boiling point 90° to 120° C.). A further recrystallization from ligroin (boiling point 70° to 90° C.) gave a brownish product of melting point 123° to 125° C. The formula of this compound is:

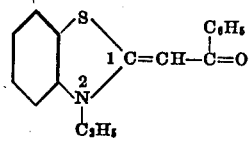

Example 6.—2-Allyl-1-propionylmethylenebenzothiazoline 9.5 g. (1 mol.) of the alliodide of 1-methylbenzothiazole (finely divided) was suspended in 50 cc. of cold, dry pyridine. The suspension was cooled to below 10° C. and 3.47 g. (1.25 mols) of propionyl chloride was added gradually with stirring. The crude product was obtained by following the procedure given in Example 1. Yield—practically theoretical. Recrystallization was effected from ligroin (boiling point 70° to 90° C.). Yield, 64%. A further recrystallization from ligroin gave a product melting at 75° to 76° C. The compound was of a cream color.

Example 7.—1-Propionylmethylene-2-n-propylbenzothiazoline 9.6 g. (1 mol.) of the n-propiodide of 1-methylbenzothiazole (finely divided) was suspended in 50 cc. of cold, dry pyridine. The suspension was chilled to below 10° C. and 3.47 g. (1.25 mols) of propionyl chloride was added gradually with stirring. The crude product was isolated as in Example 1. Yield—7.1 g. (97%). Recrystallization from ligroin (boiling point 70° to 90° C.) gave a product melting at 95° to 96° C. Yield—54%. Compound of a pale yellow color.

Example 8.—2-n-Butyl-1-propionylmethylenebenzothiazoline 10 g. (1 mol.) of the n-butiodide of 1-methylbenzothiazole (finely divided) was suspended in cold, dry pyridine (75 cc.). The suspension was chilled to below 10° C. and 3.47 g. (1.25 mols) of propionyl chloride was added gradually with stirring. The crude product was isolated as in Example 1. Crude yield—7 g. (90%). Recrystallization was effected from ligroin (boiling point 70° to 90°). After two such recrystallizations, the pure product, cream-colored, was obtained, melting at 58° to 59° C. Yield—53%.

Example 9.—4-Chloro-2-ethyl-1-propionyl-methylenebenzothiazoline

Equimolecular proportions of 4-chloro-1-methylbenzothiazole and ethyl-p-toluenesulfonate were heated at 100° C. for 7 days. The hard cake which formed was ground with acetone, chilled, filtered and finally washed with acetone and dried. Yield—90°. 15.3 g. (1 mol.) of this salt (finely divided) was suspended in 50 cc. of cold, dry pyridine. The suspension was cooled to below 10° C. and 4.65 g. (1.25 mols) of propionyl chloride was added gradually with stirring. The crude product was isolated as in Example 1. Yield 91.5%. Two recrystallizations from ligroin (boiling point 70° to 90° C.) gave a product melting at 150° to 152° C. Yield 40%.

Example 10.—1-Methyl-2-propionylmethylene-β-naphthothiazoline 7.7 g. (1 mol.) of the metho-p-toluenesulfonate of 2-methyl-β-naphthothiazole (finely divided) was suspended in 25 cc. of cold, dry pyridine. The suspension was chilled to below 10° C. and 2.03 g. (1.1 mols) of propionyl chloride was added gradually with stirring. The crude product was isolated as in Example 1. Yield—3.3 g. (61%). Two recrystallizations from ligroin (boiling point 70° to 90° C.) followed by a recrystallization from methyl alcohol gave a yellowish product, melting at 172° to 173° C. The formula of this compound is:

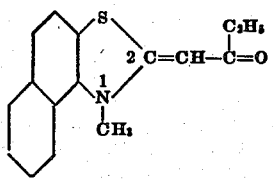

Example 11.—2-Acetylmethylene-1-ethyl-β-naphthothiazoline 4 g. (1 mol.) of the etho-p-toluenesulfonate of 2-methyl-β-naphthothiazole (finely divided) was suspended in 25 cc. of cold, dry pyridine. The suspension was chilled to below 10° C. and 0.865 g. (1.1 mols) of acetyl chloride was added gradually with stirring. The crude product was isolated as in Example 1. Yield—2 g. (74%). Recrystallization from ligroin (boiling point 90° to 120° C.) followed by a recrystallization from methyl alcohol gave a yellowish product melting at 182° to 184° C.

Example 12.—1-Ethyl-2-propionylmethylene-β-naphthothiazoline 8 g. (1 mol.) of the etho-p-toluensulfonate of 2-methyl-β-naphthothiazole (finely divided) was suspended in 25 cc. of cold, dry pyridine. The suspension was chilled to below 10° C. and 2.3 g. (1.25 mols) of propionyl chloride was added gradually with stirring. The crude product was isolated as in Example 1. Yield—4.35 g. (76%). Two recrystallizations from ligroin (boiling point 90° to 120° C.) gave a yellowish product melting at 119° to 120° C. Yield—54.4%.

Example 13.—1-Acetylmethylene-2-ethylbenzoselenazoline 14.08 g. (1 mol.) of the ethiodide of 1-methylbenzoselenazole (finely divided) was suspended in 50 cc. of cold, dry pyridine. The suspension was chilled to below 10° C. and 3.92 g. (1.25 mols) of acetyl chloride was added gradually with stirring. The crude product was isolated as in Example 1. After two recrystallizations from ligroin (boiling point 90° to 120° C.) a yellowish product melting at 99° to 100° was obtained. Yield—25%. The formula of this compound is:

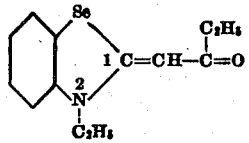

Example 14.—2-Ethyl-1-propionylmethylene-benzoselenazoline 14.08 g. (1 mol.) of the ethiodide of 1-methylbenzoselenazole (finely divided) was suspended in 50 cc. of cold, dry pyridine. The suspension was chilled to below 10° C. and 4.65 g. (1.25 mols) of propionyl chloride was added gradually with stirring. The crude product was isolated as in Example 1. After recrystallization from ligroin (boiling point 90° to 120° C.) a yellowish product melting at 67° to 68° was obtained.

Example 15.—1-Trichloroacetylmethylene-2-ethylbenzothiazoline 14 g. (1 mol.) of 1-methylbenzothiazole etho-p-toluene-sulfonate (finely divided) was suspended in 50 cc. of dry pyridine. The suspension was chilled to below 0° C. and 9.1 g. (1.25 mols) of trichloracetyl chloride was added gradually with stirring. The reaction mixture was allowed to stand at about 0° C. for twenty minutes, at room temperature, with frequent agitation, for thirty minutes and finally was heated at 100° C. for fifteen minutes. The major part of the pyridine was distilled off under reduced pressure and the residue well stirred with 300 cc. of cold water. The aqueous mixture was allowed to stand at 0° C. for about twelve hours. The solid material was filtered off, washed with water and air dried at ordinary temperatures. The yield of crude product was 12.9 g. (practically theoretical). Recrystallization from 1400 cc. of ligroin (boiling point 70° to 90° C.) followed by two recrystallizations from methyl alcohol (19 cc. per grm. of material) gave pale yellow needles. Melting point 139–141° C. Yield 7.8 g. (60%).

Example 16.—2-Ethyl-1-lauroylmethylenebenzothiazoline 14 g. (1 mol.) of 1-methylbenzothiazole etho-p-toluene-sulfonate (finely divided) was suspended in 50 cc. of cold, dry pyridine. The suspension was chilled to below 0° C. and 10.93 g. (1.25 mols) of lauroyl chloride was added gradually with stirring. The crude product was isolated as in Example 15. Yield 14.4 g. (practically theoretical). The crude product was recrystallized once from 275 cc. of ligroin (boiling point 70° to 90° C.) and a second time from 220 cc. of ligroin (boiling point 35° to 55° C.). A slightly reddish powder was obtained melting at 59° to 61° C. Yield 9.4 g. (6.5%). The formula of this compound is:

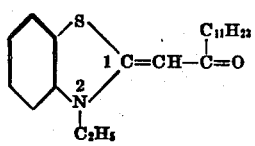

Example 17.—2-Ethyl-1-furoylmethylenebenzothiazole 14 g. (1 mol.) of 1-methylbenzothiazoline ethop-toluene-sulfonate (finely divided) was suspended in 50 cc. of cold, dry pyridine. The suspension was chilled to below 0° C. and 6.53 g. (1.25 mols) of furoyl chloride was added gradually with stirring. The crude product was isolated as in Example 15. Yield—practically theoretical. The crude product was recrystallized from 2500 cc. of ligroin (boiling point 90° to 120° C.). The first crop of crystals (9.5 g.) was recrystallized again from ligroin (boiling point 90° to 120° C.—185 cc. per gram of material) and a further recrystallization was effected from n-propyl alcohol (4.5 cc. per gram of material). Yield 58%. Melting point 150 to 152 C. The formula of this compound is:

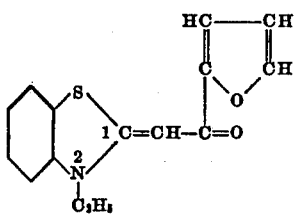

Example 18.—2-Ethyl-1-(m-nitrobenzoyl)-methylenebenzothiazole 14 g. (1 mol.) of 1-methylbenzothiazoline etho-p-toluene-sulfonate (finely divided) was suspended in 50 cc. of cold, dry pyridine. The suspension was chilled to below 0° C. and 9.28 g. (1.25 mols) of m-nitrobenzoyl chloride was added gradually with stirring. The product was isolated as in Example 15. Yield of crude product was 13.1 g.—practically theoretical. Several recrystallizations from ligroin (boiling point 90° to 120° C.) followed by a recrystallization from methyl alcohol (640 cc. per gram of material) gave minute yellow crystals melting at 239° to 240° C. The formula of this compound is:

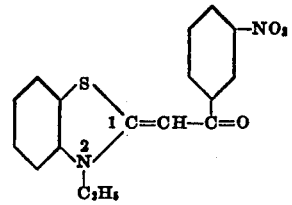

From these examples it is apparent that a large number of acylmethylene derivatives of benzothiazolines, naphthothiazolines, benzoselenazolines and naphthoselenazolines can be prepared by our process. It is further apparent that substituents in the benzo or naphtho nucleus do not affect the course of the reaction.

In preparing carbocyanine dyes from these new acylmethylene derivatives according to the process set forth in our copending application Serial No. 30,736, filed July 10, 1935, the acylmethylene derivatives are reacted with cyclammonium quaternary salts containing a reactive methyl group in the alpha or gamma position, in the presence of a water-binding agent, such as acetic anhydride or the like.

What we claim as our invention and desire to be secured by Letters Patent of the United States is:

1. A compound of the following formula:

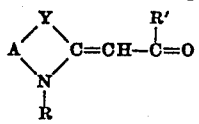

wherein A represents an organic group selected from the group consisting of phenylene and naphthylene groups, R represents an alkyl group, R' represents an organic group selected from the group consisting of alkyl, aralkyl and aryl groups and Y represents an atom selected from the group consisting of sulfur and selenium.

2. A compound of the following formula:

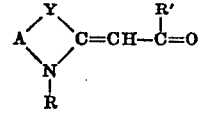

wherein A represents an organic group selected from the group consisting of phenylene and naphthylene groups, R and R' represent alkyl groups and Y represents an atom selected from the group consisting of sulfur and selenium.

3. A compound of the following formula:

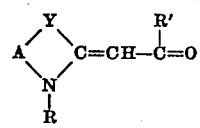

wherein A represents a phenylene group, R represents an alkyl group, R' represents an organic group selected from the group consisting of alkyl, aralkyl, and aryl groups and Y represents an atom selected from the group consisting of sulfur and selenium.

4. A compound of the following formula:

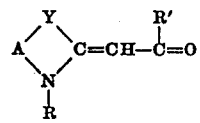

wherein A represents a phenylene group, R and R' represent alkyl groups and Y represents an atom selected from the group consisting of sulfur and selenium.

5. A compound of the following formula:

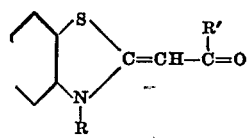

wherein R and R' represent alkyl groups.

6. A 1-acetylmethylene-2-alkylbenzothiazoline.
7. A 1-propionylmethylene-2-alkylbenzothiazoline.
8. A compound of the following formula:

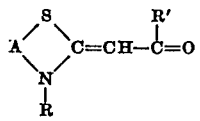

wherein A represents a naphthylene group and R and R' represent alkyl groups.

9. A 2-acetylmethylene-1-alkyl-β-naphthothiazoline.

10. A process for preparing an acylmethylene compound comprising condensing, in the presence of an acid-binding agent, an acyl halide containing at least two carbon atoms with a compound of the following formula:

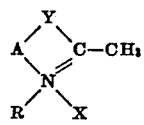

wherein A represents an organic group selected from the group consisting of phenylene and naphthylene groups, R represents an alkyl group, X represents an acid radical and Y represents an atom selected from the group consisting of sulfur and selenium.

11. A process for preparing an acylmethylene compound comprising condensing, in the presence of an acid-binding agent, an acyl chloride containing at least two carbon atoms with a compound of the following formula:

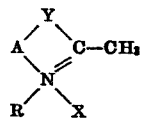

wherein A represents an organic group selected from the group consisting of phenylene and naphthylene groups, R represents an alkyl group, X represents an acid radical and Y represents an atom selected from the group consisting of sulfur and selenium.

12. A process for preparing an acylmethylene compound comprising condensing, in the presence of a tertiary organic base, an acyl chloride containing at least two carbon atoms with a compound of the following formula:

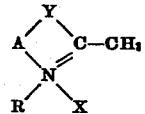

wherein A represents an organic group selected from the group consisting of phenylene and naphthylene groups, R represents an alkyl group, X represents an acid radical and Y represents an atom selected from the group consisting of sulfur and selenium.

13. A process for preparing an acylmethylene compound comprising condensing, in the presence of pyridine, an acyl chloride containing at least two carbon atoms with a compound of the following formula:

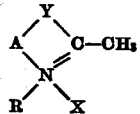

wherein A represents an organic group selected from the group consisting of phenylene and naphthylene groups, R represents an alkyl group, X represents an acid radical and Y represents an atom selected from the group consisting of sulfur and selenium.

14. A process for preparing an acylmethylene compound comprising condensing, in the presence of pyridine, an acyl chloride containing at least two carbon atoms with a compound of the following formula:

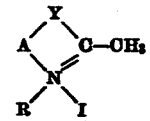

wherein A represents an organic group selected from the group consisting of phenylene and naphthylene groups, R represents an alkyl group and Y represents an atom selected from the group consisting of sulfur and selenium.

15. A process for preparing an acylmethylene compound comprising condensing, in the presence of pyridine, an acyl chloride containing at least two carbon atoms with a compound of the following formula:

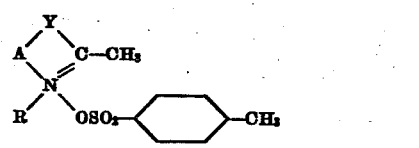

wherein A represents an organic group selected from the group consisting of phenylene and naphthylene groups, R represents an alkyl group and Y represents an atom selected from the group consisting of sulfur and selenium.

16. A process for preparing an acylmethylene compound comprising condensing, in the presence of pyridine, an acyl chloride containing at least two carbon atoms with a quaternary salt of 1-methylbenzothiazole.

17. A process for preparing an acylmethylene compound comprising condensing, in the presence of pyridine, an acyl chloride containing at least two carbon atoms with an alkiodide of 1-methylbenzothiazole.

18. A process for preparing an acylmethylene compound comprising condensing, in the presence of pyridine, an acyl chloride containing at least two carbon atoms, with a quaternary salt of 2-methyl-β-naphthothiazole.

19. A process for preparing an acylmethylene compound comprising condensing, in the presence of pyridine, an acyl chloride containing at least two carbon atoms with an alkyl-p-toluene-sulfonate of 2-methyl-β-naphthothiazole.

LESLIE G. S. BROOKER.
FRANK L. WHITE.